United States Patent
Crothers et al.

(10) Patent No.: US 8,190,272 B2
(45) Date of Patent: May 29, 2012

(54) GEOMETRIC INSPECTION OF MACHINED OBJECTS

(75) Inventors: Phillip John Crothers, Victoria (AU);
Peter Nathan Steele, Victoria (AU);
Geoffrey King Shun Lam, Victoria (AU)

(73) Assignee: The Boeing Company, Chicago, IL (US)

( * ) Notice: Subject to any disclaimer, the term of this patent is extended or adjusted under 35 U.S.C. 154(b) by 748 days.

(21) Appl. No.: 12/335,789

(22) Filed: Dec. 16, 2008

(65) Prior Publication Data

US 2010/0153058 A1    Jun. 17, 2010

(51) Int. Cl.
*G06F 19/00* (2006.01)

(52) U.S. Cl. .......................... 700/15; 901/10

(58) Field of Classification Search .............. 700/15, 700/194, 105, 98; 901/10, 41; 318/565, 318/612
See application file for complete search history.

(56) References Cited

U.S. PATENT DOCUMENTS

| | | | |
|---|---|---|---|
| 3,770,879 A | 11/1973 | Watson | |
| 4,130,787 A | 12/1978 | Allaire et al. | |
| 4,796,198 A | 1/1989 | Boultinghouse et al. | |
| 4,807,131 A | 2/1989 | Clegg | |
| 5,347,463 A * | 9/1994 | Nakamura et al. | 700/226 |
| 5,381,258 A | 1/1995 | Bordignon et al. | |
| 5,651,600 A | 7/1997 | Dorsey-Palmateer | |
| 5,887,122 A | 3/1999 | Terawaki et al. | |
| 6,375,195 B1 * | 4/2002 | Robotham | 277/394 |
| 2003/0120377 A1 | 6/2003 | Hooke et al. | |
| 2006/0106507 A1 | 5/2006 | Ledet et al. | |

FOREIGN PATENT DOCUMENTS

| | | |
|---|---|---|
| GB | 2363861 A | 1/2002 |
| WO | 0035622 A1 | 6/2000 |

OTHER PUBLICATIONS

PCT Internaitonal Search Report for PCT/US2009/068302 dated May 4, 2010.
"Virtek LaserEdge 2D and 3D Laser Templating and Positioning", Virtek, retrieved Nov. 11, 2004, pp. 1-7 www.virtek.ca/indsol.asp?industry=Aerospace.

* cited by examiner

*Primary Examiner* — Kidest Bahta
(74) *Attorney, Agent, or Firm* — Yee & Associates, P.C.

(57) ABSTRACT

A method and apparatus may be present for inspecting an object. A plurality of locations associated with a plurality of operations performed by a tool on the object may be tracked. The plurality of locations is tracked while the plurality of operations is performed on the object. A path for the tool may be mapped using the plurality of locations to form a tool path. The tool path may be compared to a model of the object.

10 Claims, 7 Drawing Sheets

GEOMETRIC INSPECTION OF MACHINED OBJECTS

BACKGROUND INFORMATION

1. Field

The present disclosure relates generally to manufacturing and, in particular, to manufacturing objects. Still more particularly, the present disclosure relates to a method and apparatus for inspecting operations performed on an object.

2. Background

In manufacturing objects, machining of an object may be performed to remove materials from the object. Machining may be performed using power-driven machine tools such as lathes, milling machines, drill presses, and other suitable tools. Machining may include processes such as, for example, without limitation, turning, drilling, milling, and other suitable processes.

Machining may require attention to many details for an object to meet specifications set out in engineering drawings or computer-aided design models. These details may include, for example, without limitation, correct dimensions, correct finish, and other suitable parameters.

Computer numerically control (CNC) tools may be used to perform various machining operations. A computer numerically controlled tool may perform machining operations in response to instructions in a program. This type of program may also be referred to as a parametric program. A parametric program may be created from a computer-aided design model of the object. The machining process may include, for example, without limitation, roughing, semi-finishing, finishing, contour milling, and other suitable processes. These, and other similar processes, may generate machined features on an object.

Although computer numerically controlled machines may provide a high degree of accuracy, verification of the machined features may still be performed to ensure that the machined features are within tolerances defined for the particular object. Certain conditions may result in the machined features being out of tolerance. For example, without limitation, unusual wear of a drill bit, faulty encoders, or other conditions may result in machined features for an object being out of a tolerance.

For example, a groove machined into an object may be deeper than specified for the object. The groove also may be in a location that is offset from the location in the design. As another example, a beveled edge created from machining may be wider than specified for the object. If the differences are greater than some threshold, these features may be considered out of tolerance.

Currently, the verification may be performed in a number of different ways. For example, a coordinate measuring machine may be used to measure the physical geometric characteristics of the object. This machine may be manually controlled by an operator or may be computer controlled. Measurements may be made by a probe attached to a moving axis on the coordinate measuring machine. The probe may touch the part of interest and may allow for collecting discreet points of data on the surface of the object.

The use of these machines to verify whether the machined features fall within a tolerance may occur after the object has been processed. This type of verification of machined features may require more time because of the additional time needed to measure and analyze the machined features. The amount of time required may vary depending on the number of measurements taken. For example, an object may be machined in about one hour. Two or more hours, however, may be needed to inspect the object.

This type of inspection may increase the time and expense for creating objects. Further, the output of objects in a manufacturing facility may be slowed down because of the time needed to inspect objects.

One solution may be to only perform an inspection of portions of the machine features. This type of sampling may reduce the amount of time needed to inspect the machine features of an object. This process, however, may result in unexpected portions of the features that are out of tolerance being undetected.

Thus, it would be advantageous to have a method and apparatus that overcomes one or more of the issues discussed above.

SUMMARY

In one advantageous embodiment, a method may be present for inspecting an object. The method may track a plurality of locations associated with a plurality of operations performed by a tool on the object. The plurality of locations may be tracked while the plurality of operations is performed on the object. A path for the tool may be created using the plurality of locations to form a tool path. The tool path may be compared to a model of the object.

In another advantageous embodiment, a method may be present for inspecting an object. The method may track a plurality of locations associated with a plurality of operations performed by a tool on the object. The plurality of locations may be tracked while the plurality of operations is performed on the object, by performing at least one of measuring a position of the tool with an optical sensor system to track the location of each of the plurality of operations performed by the tool on the object during the performance of the plurality of operations to form the plurality of locations, and measuring a position of the tool with a position sensor system used to move the tool to track the location of each of the plurality of operations performed by the tool on the object during the performance of the plurality of operations to form the plurality of locations. The plurality of locations may be a plurality of tracking tool center point locations. A path may be created for the tool using the plurality of locations to form a tool path. The tool path may be compared to a model of the object to form a comparison. The model may be a final model of the object after the performance of the plurality of operations. The plurality of operations may be performed on the object using the tool. The plurality of operations may be selected from at least one of a drilling operation, a trimming operation, a knurling operation, a milling operation, a boring operation, and a turning operation. The plurality of locations may be sent to an analysis application on a computer, wherein the creating step and the comparing step may be performed by the analysis application. A determination may be made as to whether the path is within a tolerance from the model of the object using the comparison. An alert may be generated in response to an absence of a determination that the path is within a threshold from the model of the object using the comparison. A number of actions may be performed on the object based on comparing the tool path to the model of the object. The number of actions may comprise at least one of halting performing the plurality of operations on the object using the tool if a selected number of locations is out of tolerance, flagging each location in which a location is out of tolerance, and sending a message in response to the selected number of locations being out of tolerance. The object may be selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a manufacturing facility, an engine, a frame, a spar, a part, a panel, a wheel, an engine case, a fan blade, and a building.

In yet another advantageous embodiment, an apparatus may comprise an analysis application and a data processing system. The analysis application may be capable of mapping a path for a tool using a plurality of locations from tracking a plurality of locations associated with a plurality of operations performed by a tool on the object. The plurality of locations may be tracked while the plurality of operations is performed on the object to form a tool path. The analysis application may be capable of comparing the tool path to a model of the object. The analysis application may be located on the data processing system.

In still yet another advantageous embodiment, a manufacturing environment may comprise an analysis application, a data processing system, a tracking system, and a tool. The analysis application may be capable of mapping a path for the tool using a plurality of locations from tracking a plurality of locations associated with a plurality of operations performed by a tool on the object. The plurality of locations may be tracked while the plurality of operations is performed on the object to form a tool path. The analysis application may be capable of comparing the tool path to a model of the object. The model may be a final model of the object after the performance of the plurality of operations. The analysis application may be located on the data processing system. The tracking system may be capable of tracking the location of each of the plurality of operations performed by the tool on the object during the performance of the plurality of operations to form the plurality of locations. The tracking system may comprise at least one of an optical sensor system capable of measuring a position of the tool with a metrological sensor to track the location of each of the plurality of operations performed by the tool on the object during the performance of the plurality of operations to form the plurality of locations, and a position sensor system used to move the tool to track the location of each of the plurality of operations performed by the tool on the object during the performance of the plurality of operations to form the plurality of locations. The plurality of locations may be a plurality of tracking tool center point locations. The tool may be selected from one of a computer numerically controlled machine, a robot, a lathe, a laser, a drill, an end mill, and a milling machine. The object may be selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a manufacturing facility, an engine, a frame, a spar, a part, a panel, a wheel, an engine case, a fan blade, and a building.

In a further advantageous embodiment, a computer program product may be present for inspecting an object. The computer program product may comprise a computer recordable storage medium and program code stored on the computer recordable storage medium. Program code may be present for mapping a path for a tool using a plurality of locations for a plurality operations performed on the object to form a tool path. The plurality of locations may be identified during performance of the plurality of operations on the object. Program code may also be present for comparing the tool path to a model of the object.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
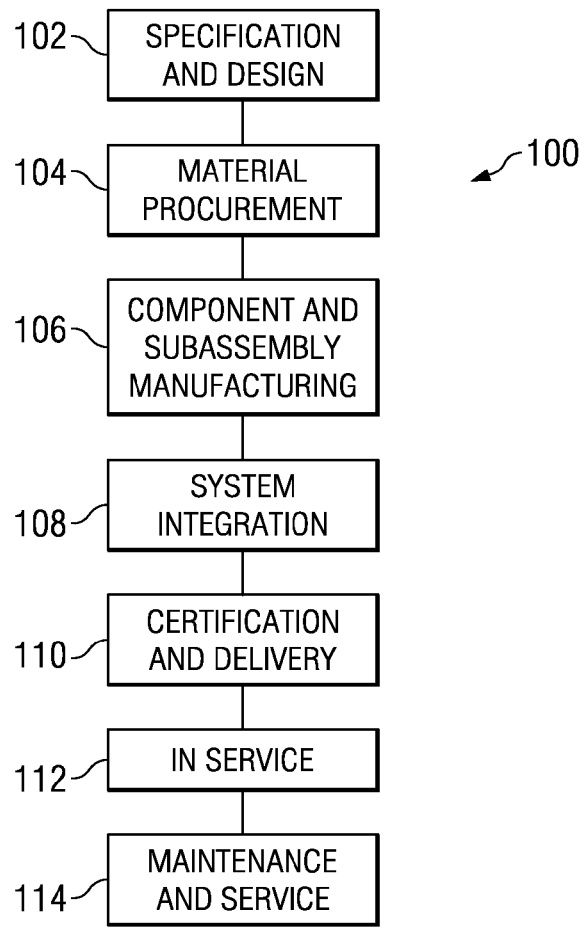
FIG. 1 is a diagram illustrating an aircraft manufacturing and service method in accordance with an advantageous embodiment.
Figure 2:
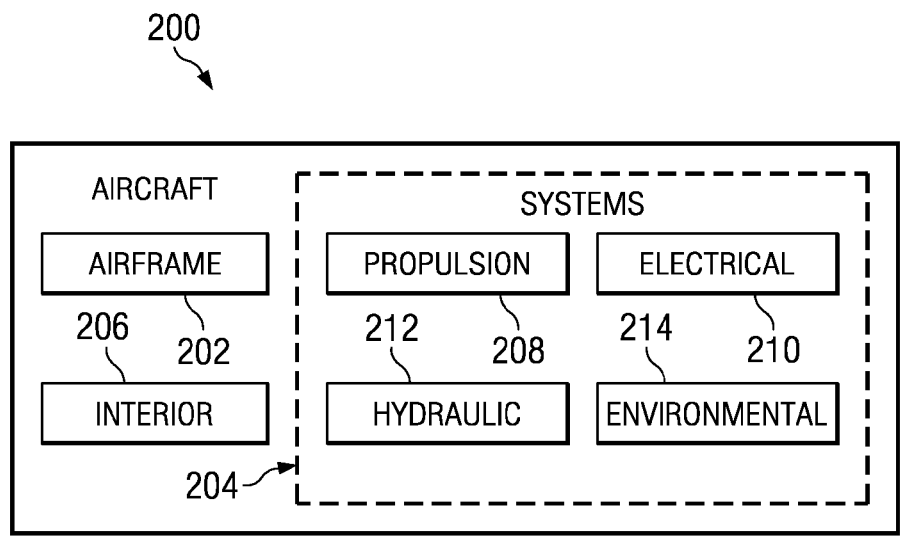
FIG. 2 is a diagram of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

The different advantageous embodiments recognize and take into account that currently used inspection processes may increase the amount of time to manufacture an object. Further, the different advantageous embodiments also recognize and take into account that sampling and/or measuring only a portion of a machined feature may result in an unmeasured portion of the machined feature being out of tolerance.

Thus, the different advantageous embodiments provide a method, apparatus, and computer program code for inspecting an object. A location of a plurality of operations performed by a tool on the object may be tracked during performance of the plurality of operations to form a plurality of locations. A path may be mapped for the tool using the plurality of locations to form a tool path. A comparison of the tool path to a model of the object may be made. This comparison may be used to identify whether any of the operations resulted in a feature being out of tolerance. This identification may be made by determining whether the path is within a threshold from the model of the object using the comparison.

Figure 3:
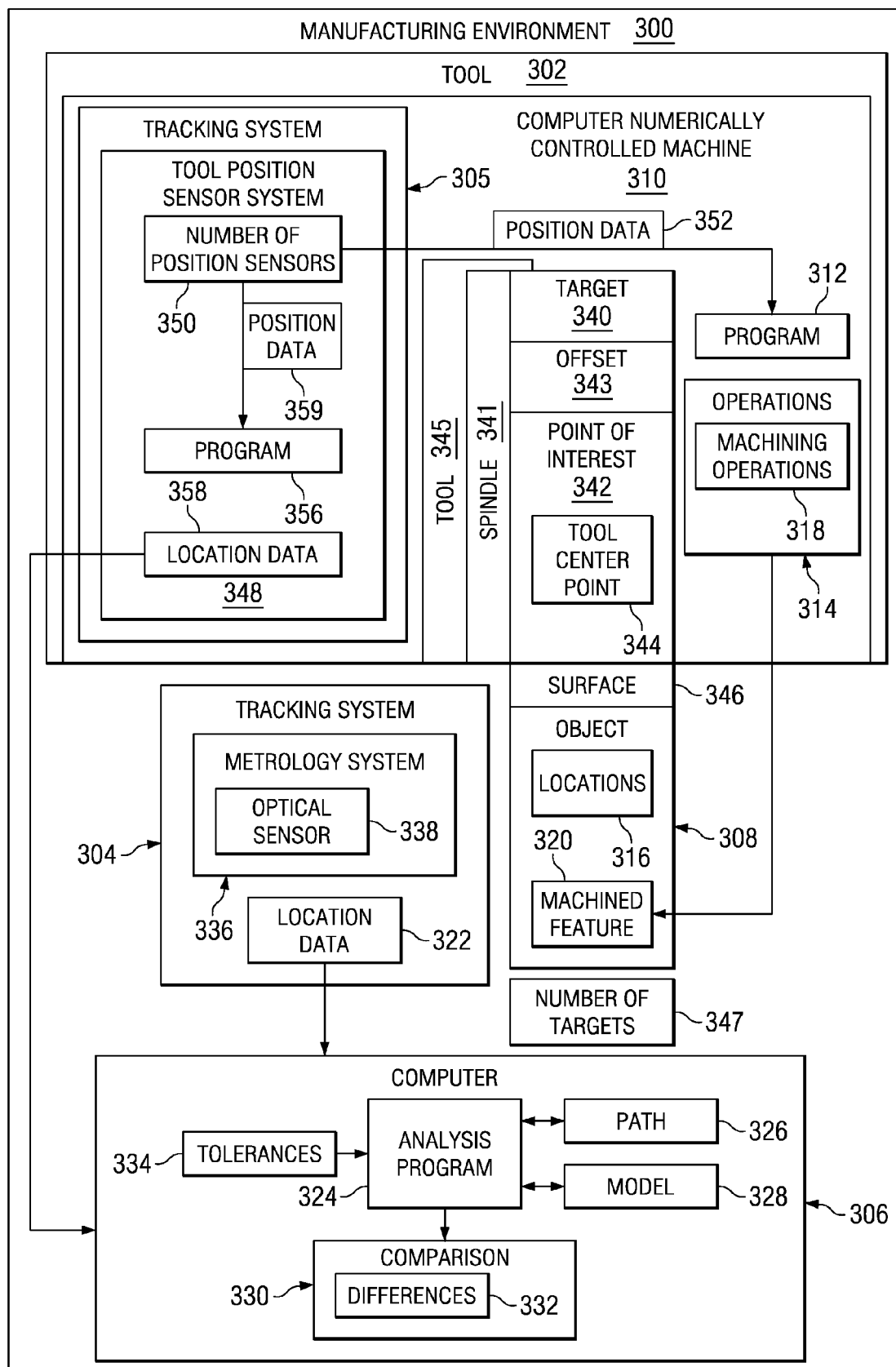
FIG. 3 is a diagram of a manufacturing environment in accordance with an advantageous embodiment.

With reference now to FIG. 3, a diagram of a manufacturing environment is depicted in accordance with an advantageous embodiment. In the illustrative example, manufacturing environment 300 may include tool 302, tracking system 304, and computer 306. These components may be used to manufacture object 308. Object 308 may take various forms.

For example, object 308 may be selected from one of, without limitation, a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a manufacturing facility, an engine, a frame, a spar, a part, a panel, a wheel, an engine case, a fan blade, a building, a component thereof, and/or some other suitable object.

In this illustrative example, tool 302 may be computer numerically controlled (CNC) machine 310. Tool 302 may take other forms in addition to computer numerically controlled machine 310. For example, without limitation, tool 302 may be, without limitation, a robot, a laser, a drill, a lathe, an end mill, a milling machine, or some other suitable tool.

Computer numerically controlled machine 310 may execute program 312 to perform operations 314 at locations 316 on object 308. In these examples, operations 314 may take the form of machining operations 318 to generate machined feature 320. Machining operations 318 may take various forms. For example, without limitation, machining operations 318 may include drilling, trimming, cutting, milling, turning, sanding, and/or other suitable operations.

In the different advantageous embodiments, tracking system 304 may track locations 316 as operations 314 are performed by tool 302. Tracking system 304 may generate location data 322, which may be sent to computer 306 for processing. In these examples, location data 322 may be in a format and/or coordinate system for comparison with model 328. In these illustrative examples, analysis program 324 may execute on computer 306 to analyze location data 322. Analysis program 324 may create path 326 from location data 322. Path 326 may be a sequence of locations in location data 322.

The sequence may be locations in which tool 302 travels while performing operations 314. Path 326 may be compared to model 328 to generate comparison 330. In these examples, model 328 may be a computer-aided design model of the object. Model 328 may contain dimensions and other information about object 308 after operations 314 are performed on object 308. Model 328 may be a model of object 308 after operations 314 have been correctly performed or performed in an ideal manner. Model 328 also may be referred to as a final model.

Comparison 330 may identify differences 332 between path 326 and model 328. Further, differences 332 may be compared with tolerances 334 to determine whether machined feature 320 is acceptable. In other words, analysis program 324 may determine whether path 326 is within a tolerance of model 328 using tolerances 334. An indication as to whether differences 332 are within tolerances 334 also may be included in comparison 330.

In the different advantageous embodiments, tracking system 304 may take a number of different forms. For example, tracking system 304 may be metrology system 336. Metrology system 336 may be any system capable of making measurements. In these examples, metrology system 336 may be implemented using a number of different types of optical sensor systems. For example, without limitation, metrology system 336 may be implemented using laser tracker or laser projection technology, photogrammetry, videogrammetry, infrared global positioning system (iGPS), or some other suitable sensor system.

Laser projection technology may be a three-dimensional laser projection system that may steer a laser beam through a specific series of points in three-dimensional space. This type of system may be implemented using an LPT100 laser radar projector available from Laser Projection Technologies, Inc. Videogrammetry and/or photogrammetry may provide three-dimensional coordinates of locations 316 on object 308 from video and/or still images taken from two different positions.

In other advantageous embodiments, metrology system 336 may be implemented using a laser tracker system. A laser tracker system such as, for example, without limitation, Leica Absolute Tracker, may be used, which may be available from Leica Geosystems. In yet other advantageous embodiments, metrology system 336 may be implemented using a tracking system such as, for example, without limitation, Constellation 3Di, which may be available from Arc Second, Inc.

With metrology system 336, locations 316 may be tracked while operations 314 are performed by tool 302. The capability to identify locations 316 during the performance of operations 314 may reduce the amount of time needed to complete object 308. This reduction in time may result from obtaining location data 322 while operations 314 are performed by tool 302. As a result, additional time needed to perform measurements after operations 314 are completed may be avoided and/or reduced.

Depending on the particular implementation, metrology system 336 may include optical sensor 338 and may use target 340. Number of targets 347 may be placed within manufacturing environment 300 in locations that may allow metrology system 336 to acquire and/or calculate a coordinate system for measuring locations 316 of object 308 at point of interest 342.

Target 340 may be placed in a constant relationship with point of interest 342. This constant relationship may be offset 343. Offset 343 may be a line described in three dimensions. Offset 343 may be used to identify locations 316 to generate location data 322. Point of interest 342 may be, for example, without limitation, tool center point 344. Tool center point 344 may be a program point of action for computer numerically controlled machine 310. In other words, tool center point 344 may be a location where computer numerically controlled machine 310 may contact surface 346 of object 308. The contact may be made by, without limitation, a drill tip, a focus point of a laser beam, or some other suitable contact with surface 346 of object 308.

Optical sensor 338 may identify the location of target 340 during operations 314. In these illustrative examples, locations 316 may be in three-dimensional coordinates. Metrology system 336 may be, for example, a laser tracker, for which six degrees of freedom defining three translational dimensions and three rotational dimensions may be made. This type of system may allow for orientation and position of point of interest 342 to be measured when generating location data 322. This type of laser tracker may take into account computer numerically controlled machine 310 operating in different orientations.

When metrology system 336 takes the form of a laser tracker system, target 340 may be a laser tracker probe positioned on computer numerically controlled machine 310. In these examples, target 340 may be positioned on spindle 341 having a constant relation to tool 345.

In some advantageous embodiments, tracking system 305 may generate location data 358. Tracking system 305 may be, for example, tool position sensor system 348. Location data 322 may be generated as operations 314 occur. In other words, location data 322 may be generated and sent as soon as a new location within locations 316 is detected by tracking systems 304 or 305.

In another advantageous embodiment, tracking system 305 may be implemented using tool position sensor system 348 located within tool 302. Tool position sensor system 348, in these examples, may include number of position sensors 350. Number of position sensors 350 may include, for example, without limitation, at least one of an encoder, a scale, an accelerometer, and/or other suitable sensors.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

Program 312 in computer numerically controlled machine 310 may obtain position data 352 from number of position sensors 350 to control tool 302 to perform operations 314. Program 312 may be considered an active program that controls tool 302 in computer numerically controlled machine 310.

In the different advantageous embodiments, program 356 in tracking system 305 may generate location data 358 using number of position sensors 350. Program 356 may be considered a passive control process that may only make measurements to generate location data 358. Program 356 may include code that may be found in program 312 to obtain sensor information. Program 356, however, may not perform any act of operations or generate any commands to computer numerically controlled machine 310. Program 356 may send position data 359 as location data 358 to computer 306 for analysis. In the different advantageous embodiments, position data 359 is independent of position data 352. In other words, position data 359 may be collected or generated at different intervals and/or time from position data 352.

In the different advantageous embodiments, location data 322 and/or location data 358 may be verified to determine whether the data is valid. For example, sample checks may be made to ensure that object 308 has not moved from the expected position, tool 302 has not suffered wear from expected dimensions, and other anomalies have not occurred. Sample measurements may be taken, in some advantageous embodiments, to ensure that the measured data may be correct.

In yet other advantageous embodiments, monitoring computer numerically controlled machine 310 may be performed to determine whether anomalies may be present. This monitoring may include, for example, without limitation, spindle torque, power, and other suitable parameters. Anomalies, in these monitored parameters, may provide indications of variations or lack of uniformity in the performing of operations 314. This type of monitoring may be used to validate the data.

The illustration of manufacturing environment 300 in FIG. 3 is not meant to imply physical or architectural limitations to the manner in which different advantageous embodiments may be implemented. In some advantageous embodiments, other components may be used in addition to, or in place of, the ones illustrated. For example, tracking system 304 and analysis program 324 may be located in the same data processing system.

In yet other advantageous embodiments, location data 322 may be generated by both tracking system 304 and tracking system 305. Location data 322 may be generated by tracking system 304 and/or 305 while operations 314 are performed. In other advantageous embodiments, tracking system 304 and/or tracking system 305 may generate location data 322 and/or location data 358 continuously or at different intervals and/or events, depending on the particular implementation.

In further advantageous embodiments, one or more additional tools in addition to tool 302, and one or more additional objects in addition to object 308, may be tracked by tracking system 304 during the performance of operations on these additional objects by the tools.

Figure 4:
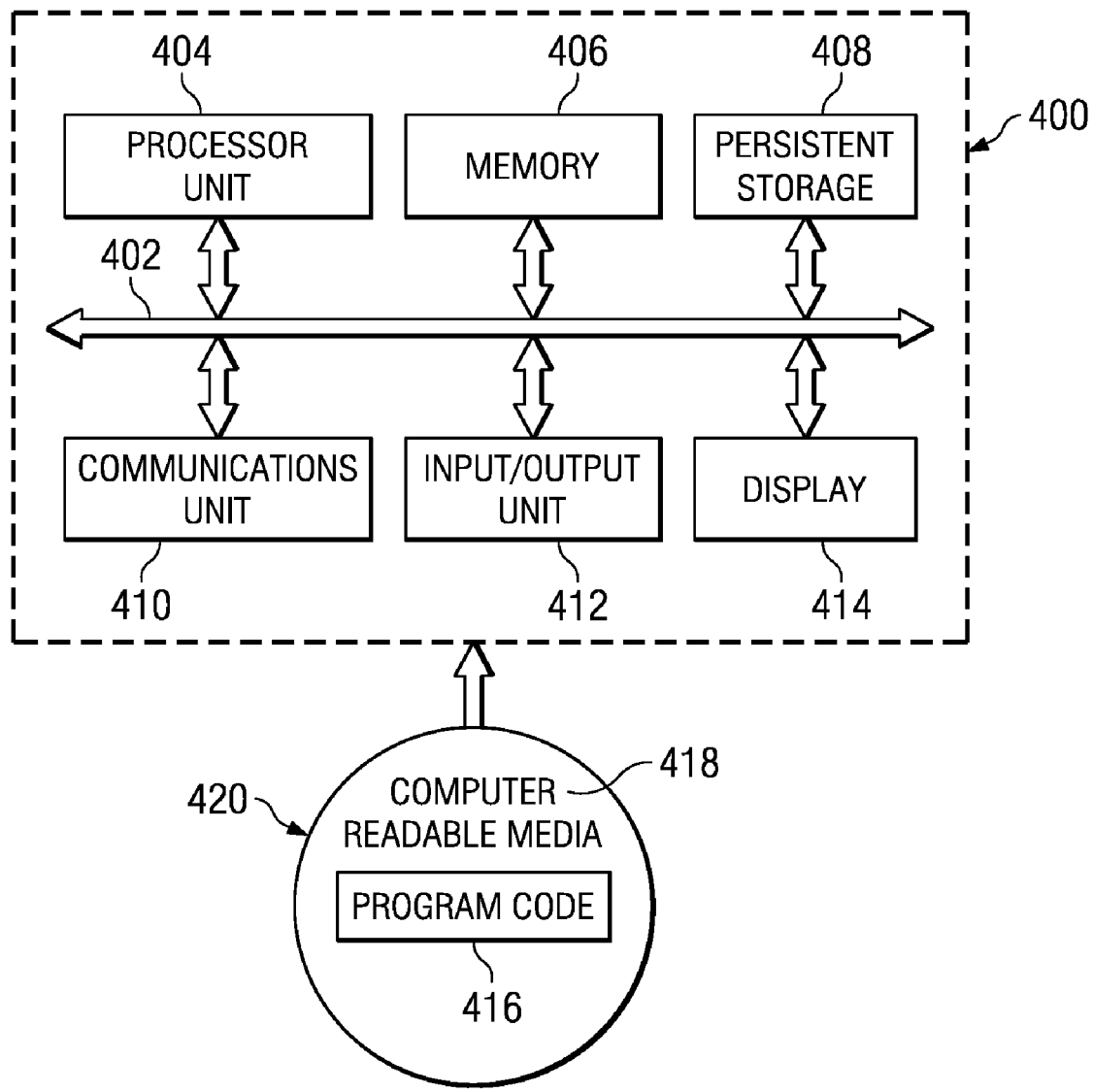
FIG. 4 is a diagram of a data processing system in accordance with an illustrative embodiment.

Turning now to FIG. 4, a diagram of a data processing system is depicted in accordance with an illustrative embodiment. Data processing system 400 may be located in various systems and/or components within manufacturing environment 300. For example, data processing system 400 may be used in tracking system 304, computer 306, computer numerically controlled machine 310, and/or other suitable components within manufacturing environment 300. In this illustrative example, the locations may be generated by tracking system 304. In particular, hardware and/or software within tracking system 304 may generate the locations.

In this illustrative example, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a set of one or more processors or may be a multi-processor core, depending on the particular implementation. Further, processor unit 404 may be implemented using one or more heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices. A storage device is any piece of hardware that is capable of storing information either on a temporary basis and/or a permanent basis. Memory 406, in these examples, may be, for example, a random access memory or any other suitable volatile or non-volatile storage device. Persistent storage 408 may take various forms, depending on the particular implementation.

For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard and mouse. Further, input/output unit 412 may send output to a printer. Display 414 provides a mechanism to display information to a user.

Instructions for the operating system and applications or programs are located on persistent storage 408. These instructions may be loaded into memory 406 for execution by processor unit 404. The processes of the different embodiments may be performed by processor unit 404 using computer implemented instructions, which may be located in a memory, such as memory 406.

These instructions are referred to as program code, computer usable program code, or computer readable program code that may be read and executed by a processor in processor unit 404. The program code in the different embodiments may be embodied on different physical or tangible computer readable media, such as memory 406 or persistent storage 408.

Program code 416 is located in a functional form on computer readable media 418 that is selectively removable and may be loaded onto or transferred to data processing system 400 for execution by processor unit 404. Program code 416 and computer readable media 418 form computer program product 420 in these examples. In one example, computer readable media 418 may be in a tangible form, such as an optical or magnetic disc that is inserted or placed into a drive or other device that is part of persistent storage 408 for transfer onto a storage device, such as a hard drive that is part of persistent storage 408.

In a tangible form, computer readable media 418 also may take the form of a persistent storage, such as a hard drive, a thumb drive, or a flash memory that is connected to data processing system 400. The tangible form of computer readable media 418 is also referred to as computer recordable storage media. In some instances, computer readable media 418 may not be removable.

Alternatively, program code 416 may be transferred to data processing system 400 from computer readable media 418 through a communications link to communications unit 410 and/or through a connection to input/output unit 412. The communications link and/or the connection may be physical or wireless in the illustrative examples. The computer readable media also may take the form of non-tangible media, such as communications links or wireless transmissions containing the program code.

In some illustrative embodiments, program code 416 may be downloaded over a network to persistent storage 408 from another device or data processing system for use within data processing system 400. For instance, program code stored in a computer readable storage medium in a server data processing system may be downloaded over a network from the server to data processing system 400. The data processing system providing program code 416 may be a server computer, a client computer, or some other device capable of storing and transmitting program code 416.

The different components illustrated for data processing system 400 are not meant to provide architectural limitations to the manner in which different embodiments may be implemented. The different illustrative embodiments may be implemented in a data processing system including components in addition to, or in place of, those illustrated for data processing system 400. Other components shown in FIG. 4 can be varied from the illustrative examples shown.

The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 400 is any hardware apparatus that may store data. Memory 406, persistent storage 408, and computer readable media 418 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system.

Additionally, a communications unit may include one or more devices used to transmit and receive data, such as a modem or a network adapter. Further, a memory may be, for example, memory 406 or a cache such as found in an interface and memory controller hub that may be present in communications fabric 402.

Figure 5:
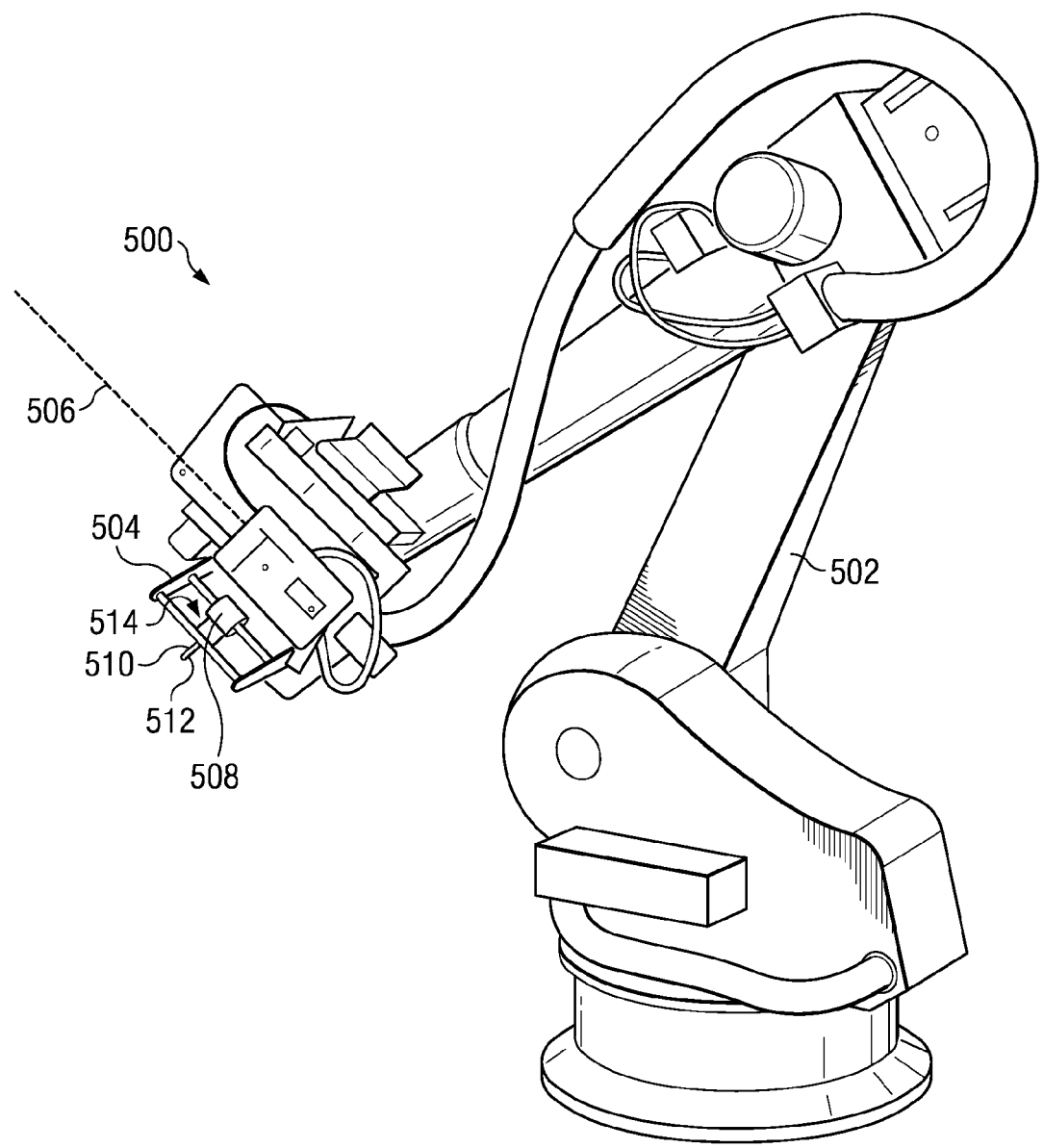
FIG. 5 is a diagram illustrating a computer numerically controlled machine in accordance with an advantageous embodiment.

With reference now to FIG. 5, a diagram illustrating a computer numerically controlled machine is depicted in accordance with an advantageous embodiment. Computer numerically controlled machine 500 may be an example of one implementation for computer numerically controlled machine 310 in FIG. 3. In this example, computer numerically controlled machine 500 comprises robot 502 and drilling end effector 504. In this example, target 506 may be a laser tracker probe. Target 506 may be positioned on end effector spindle 508 of computer numerically controlled machine 500.

In this example, target 506 may have a constant relation to point of interest 510, which may take the form of tool center point 512. Offset 514 from point of interest 510 to target 506 may be identified and may be constant. In other words, target 506 does not change in position relative to point of interest 510 during operations performed by computer numerically controlled machine 500. Offset 514 may be used to identify the location of point of interest 510 during different operations performed by computer numerically controlled machine 500.

Figure 6:
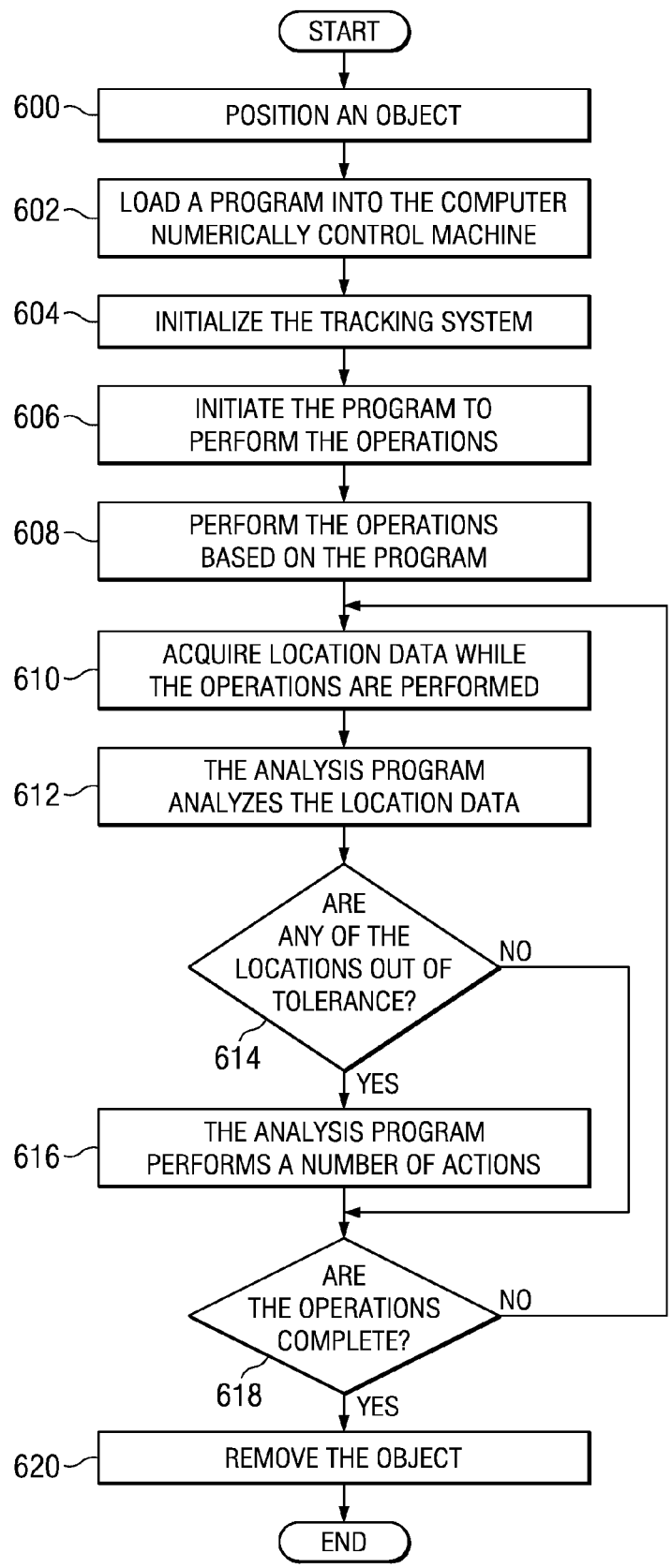
FIG. 6 is a flowchart of a process for performing operations in an object in accordance with an advantageous embodiment.

With reference now to FIG. 6, a flowchart of a process for performing operations on an object is depicted in accordance with an advantageous embodiment. The process illustrated in FIG. 6 may be implemented in a manufacturing environment such as, for example, without limitation, manufacturing environment 300 in FIG. 3.

The process may begin by positioning object 308 (operation 600). In operation 600, object 308 may be put into place for performing operations 314 on object 308. This positioning may be performed manually by human operators and/or by a robot or other automated system. The process may load program 312 into computer numerically controlled machine 310 (operation 602). Program 312 may contain instructions to control computer numerically controlled machine 310 to perform operations 314 on object 308.

The process may initialize tracking system 304 (operation 604). The initialization of tracking system 304 may vary depending on the type of tracking system being used. If tracking system 304 is metrology system 336, target 340 and number of targets 347 may be placed on computer numerically controlled machine 310 and/or other places within manufacturing environment 300.

In some advantageous embodiments, these targets may already be in place. Operation 604 also may include initiating a program to collect location data 322 during operations 314 performed on object 308. If tracking system 304 is located within computer numerically controlled machine 310, operation 604 may involve initializing program 356.

The process may then initiate program 312 to perform operations 314 on object 308 (operation 606). These operations may be various operations performed to machine object 308. The process may then perform operations 314 based on program 312 (operation 608).

The process may then acquire location data 322 while operations 314 are being performed (operation 610). Operation 610 may involve sending location data 322 from tracking system 304 and/or tracking system 305 to analysis program 324 in computer 306. Analysis program 324 may then analyze location data 322 (operation 612). This analysis may include mapping path 326 for comparing path 326 to model 328. A determination may be made as to whether any of the locations are out of tolerance (operation 614).

If any of the locations are out of tolerance, analysis program 324 may perform a number of actions (operation 616). The number of actions may include, for example, without limitation, at least one of halting operations 314 on object 308, flagging each location in locations 316 in which a location is out of tolerance, sending a message indicating that a selected number of locations may be out of tolerance, and some other suitable actions.

Next, a determination may be made as to whether operations 314 are complete (operation 618). Operations 314 on object 308 may be complete if program 312 has been completed by computer numerically controlled machine 310. Operations 314 also may be complete if one of the actions in operation 616 may be to halt performing operations 314 in response to a selected number of locations 316 being out of tolerance. If operations 314 are complete, object 308 may be removed (operation 620), with the process terminating thereafter. With reference again to operation 618, if operations 314 are not complete, the process may return to operation 610 to perform the next operation in operations 314.

Figure 7:
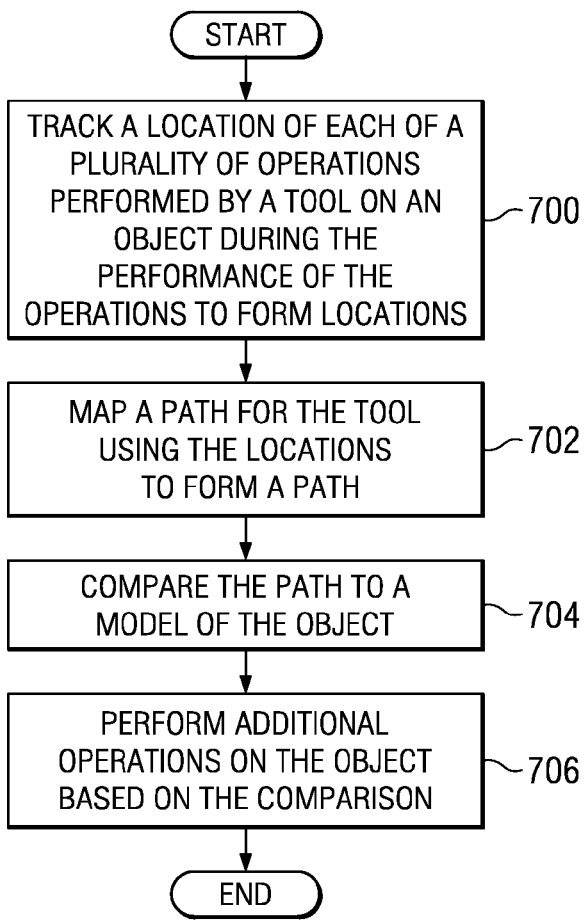
FIG. 7 is a high-level flowchart of a process for inspecting an object in accordance with an advantageous embodiment.

With reference now to FIG. 7, a high-level flowchart of a process for inspecting an object is depicted in accordance with an advantageous embodiment. The process illustrated in FIG. 7 may be implemented in a manufacturing environment such as, for example, manufacturing environment 300 in FIG. 3. One or more of the different operations may be implemented in various programs such as, for example, analysis program 324 and/or program 312.

The process may begin by tracking a location of each of a plurality of operations 314 performed by tool 302 on object 308 during the performance of operations 314 to form locations 316 (operation 700). The process may then map path 326 for tool 302 using locations 316 to form path 326 (operation 702). Path 326 may be mapped from locations 316 in these examples. The process may then compare path 326 to model 328 of object 308 (operation 704).

The process may then perform additional operations on object 308 based on comparison 330 (operation 706). These additional actions may be, for example, without limitation, sending object 308 for additional processing or delivery, re-performing one or more of operations 314 performed by tool 302, discarding object 308, or some other suitable action. The process may then terminate.

Figure 8:
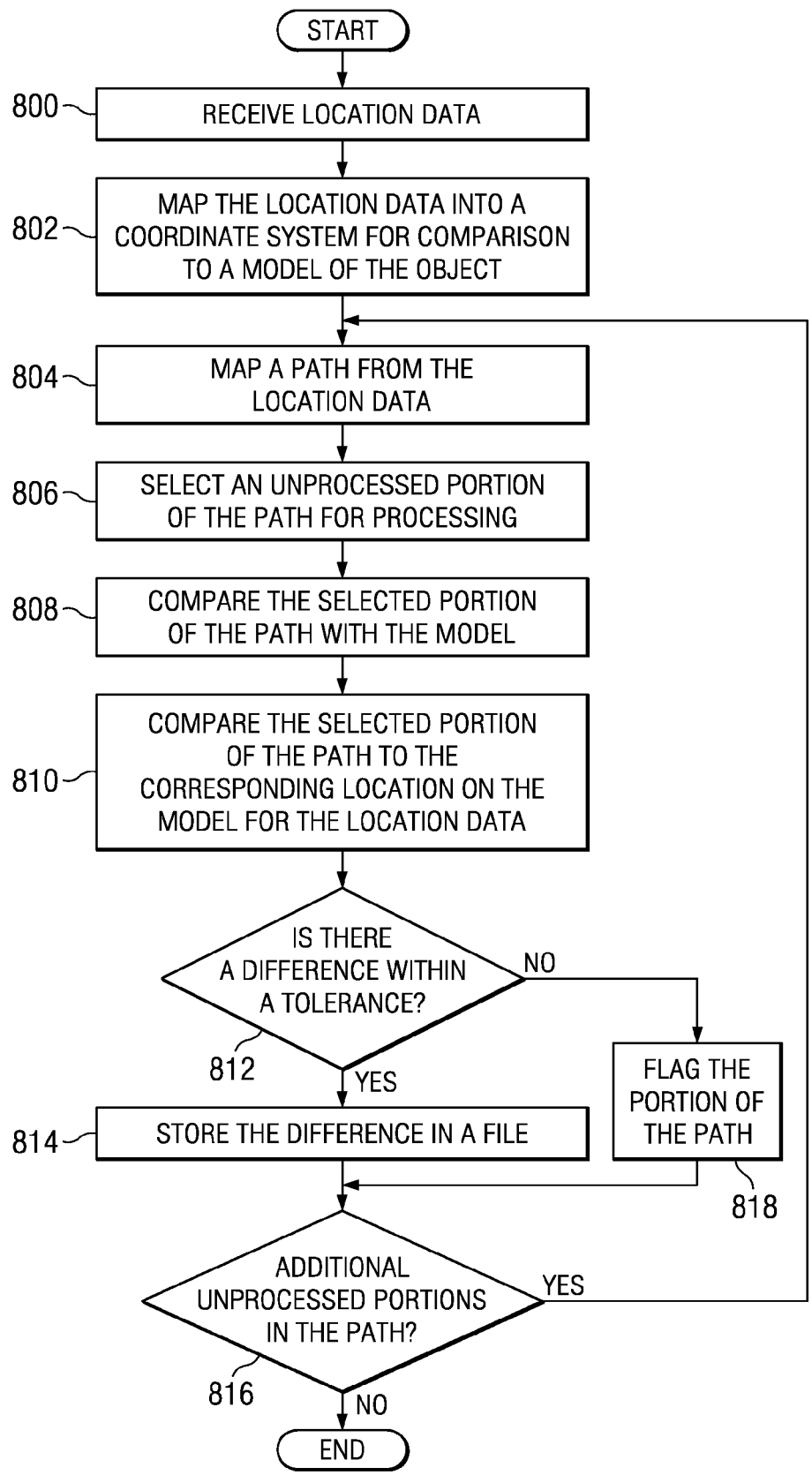
FIG. 8 is a flowchart of a process for inspecting an object in accordance with an advantageous embodiment.

With reference now to FIG. 8, a flowchart of a process for inspecting an object is depicted in accordance with an advantageous embodiment. The process illustrated in FIG. 8 may be implemented in a software component such as, for example, analysis program 324 in FIG. 3.

The process may begin by receiving location data 322 (operation 800). Location data 322 may be received from tracking system 304 in these examples. The process may map location data 322 into a coordinate system for comparison to model 328 of object 308 (operation 802). Operation 802 may be performed to allow for a comparison of location data 322 to model 328. Of course, in some advantageous embodiments, location data 322 may be in the coordinate system of model 328 and may not need any adjustments and/or transformations.

The process may then map path 326 from location data 322 (operation 804). Path 326 may be formed by locations within location data 322. An unprocessed portion of path 326 may be selected for processing (operation 806). The process may then compare the selected portion of path 326 with model 328 (operation 808). The selected portion of path 326 may be compared to the corresponding location on model 328 for location data 322 (operation 810). In operation 810, the difference may be, for example, a positive value, a negative value, or zero.

A determination may be made as to whether the difference is within a tolerance (operation 812). If the difference is within a tolerance, the process may store the difference in a file (operation 814). The process may then determine whether additional unprocessed portions are present in path 326 (operation 816). If additional unprocessed portions are present, the process may return to operation 804. Otherwise, the process may terminate. With reference again to operation 812, if the difference is not within a tolerance, the process may flag the portion of path 326 (operation 818). The process may then proceed to operation 816 as described above.

The receipt of location data 322 in operation 800 may occur while operations 314 are still being performed on object 308. In this type of implementation, the generation of path 326 in the analysis of differences 332 between path 326 and model 328 may be performed dynamically while operations 314 to create a machined feature are still being performed. In other advantageous embodiments, the analysis may be made after operations 314 have been completed.

Figure 9:
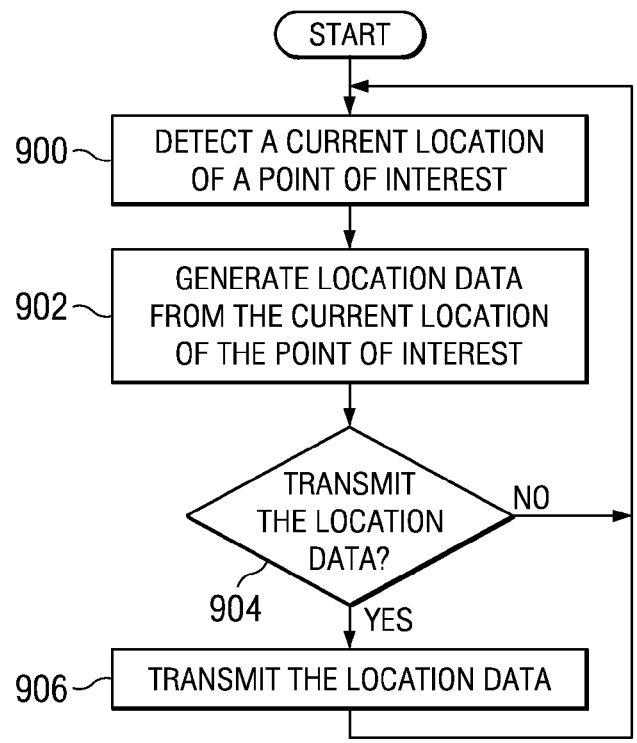
FIG. 9 is a flowchart of a process for generating location data in accordance with an advantageous embodiment.

With reference now to FIG. 9, a flowchart of a process for generating location data is depicted in accordance with an advantageous embodiment. The process illustrated in FIG. 9 may be implemented in software and/or hardware. For example, the process illustrated in FIG. 9 may be implemented in at least one of metrology system 336 and tool position sensor system 348. In particular, hardware and/or software, in these systems, may implement these operations.

The process may begin by detecting a current location of a point of interest (operation 900). The process may generate location data from the current location of the point of interest (operation 902). The process may generate the location data in operation 902 in a coordinate system of interest. In these examples, the coordinate system of interest may be the coordinate system of the model to which the location data may be compared. A determination may be made as to whether to transmit the location data (operation 904).

This determination may be made by determining whether a particular event has occurred. The event may be a periodic and/or non-periodic event. For example, the event may be the lapse of a timer. In other advantageous embodiments, the event may be the movement of the point of interest. If the location data is to be transmitted, the process may transmit the location data (operation 906) and then return to operation 900. With reference again to operation 904, if the location data is not to be transmitted, the process may then return to operation 900.

In some advantageous embodiments, operation 904 may be unnecessary. With this type of embodiment, location data may be generated and transmitted dynamically. In other words, location data may be transmitted for use as quickly as possible when the location data is generated. In other advantageous embodiments, the event may be a completion of operations on the object.

The flowcharts and block diagrams in the different depicted embodiments illustrate the architecture, functionality, and operation of some possible implementations of apparatus, methods, and computer program products. In this regard, each block in the flowchart or block diagrams may represent a module, segment, or portion of computer usable or readable program code, which comprises one or more executable instructions for implementing the specified function or functions.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a method and apparatus for inspecting an object. A location of each of a plurality of operations performed by a tool on the object during performance of the plurality of operations of the tool may be tracked to perform a plurality of locations. A path may be mapped for the tool using the plurality of locations. The path may then be compared to a model of the object. The comparison may then be used to perform an additional action on the object.

With one or more of the different advantageous embodiments, additional time required for another phase or cycle to perform inspections may be reduced and/or eliminated. The different advantageous embodiments perform checks for accuracy or precision of a machined feature while operations are being performed.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for inspecting an object during performance of an operation, the method comprising:
   tracking a plurality of locations corresponding to a plurality of operations performed by a tool on the object, wherein the plurality of locations is tracked while the plurality of operations is performed on the object, by performing at least one of measuring a position of the tool with a metrology system to track a corresponding location of the each of the plurality of operations performed by the tool in order to form the plurality of locations, and measuring the position of the tool with a position sensor system used to move the tool in order to track the corresponding location of the each of the plurality of operations performed by the tool in order to form the plurality of locations, wherein the plurality of locations is a plurality of tracking tool center point locations;
   generating a map of a path of the tool using the plurality of locations to form a tool path;
   comparing the tool path to a model of the object to form a comparison, wherein the model is a final model of the object after the performance of the plurality of operations;
   performing the plurality of operations on the object using the tool, wherein the plurality of operations is selected from at least one of a drilling operation, a trimming operation, a knurling operation, a milling operation, a boring operation, and a turning operation;
   sending the plurality of locations to an analysis application on a computer, wherein creating and comparing are performed by the analysis application;
   determining whether the path is within a tolerance from the model of the object using the comparison;
   responsive to an absence of a determination that the path is within a threshold from the model of the object using the comparison, generating an alert; and
   performing a number of actions on the object based on comparing the tool path to the model of the object, wherein the number of actions comprises at least one of halting performing the plurality of operations on the object using the tool if a selected number of locations is out of tolerance, flagging each corresponding location which is out of tolerance, and sending a message in response to the selected number of locations being out of tolerance, wherein the object is selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a manufacturing facility, an engine, a frame, a spar, a part, a panel, a wheel, an engine case, a fan blade, and a building.

2. The method of claim 1, wherein tracking further comprises:
   passively measuring the position of the tool with the position sensor system.

3. The method of claim 1, wherein tracking further comprises:
   sending a laser beam from a 6-degree-of-freedom laser tracker onto a target attached to the tool; and
   tracking the corresponding location of the each of the plurality of operations performed by the tool using a plurality of responses detected by the laser tracker.

4. A manufacturing environment comprising:
   an analysis application configured to generate a map of a path of a tool using a plurality of locations from tracking a plurality of locations corresponding to a plurality of operations performed by a tool on the object, wherein the plurality of locations is tracked while the plurality of operations is performed on the object to form a tool path, and wherein the analysis application is further configured to compare the tool path to a model of the object, wherein the model is a final model of the object after the performance of the plurality of operations;
   a data processing system, wherein the analysis application is located on the data processing system;
   a tracking system configured to track a corresponding location of each of the plurality of operations to form the plurality of locations, wherein the tracking system comprises at least one of metrology system configured to measure a position of the tool with a sensor in order to track the corresponding location of the each of the plurality of operations performed by the tool in order to form the plurality of locations, and the position sensor system used to move the tool to track the corresponding location of the plurality of operations performed by the tool in order to form the plurality of locations, wherein the plurality of locations is a plurality of tracking tool center point locations; and
   the tool, wherein the tool is selected from one of a computer numerical control machine, a lathe, a laser, a drill, an end mill, and a milling machine, and wherein the object is selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a manufacturing facility, an engine, a frame, a spar, a part, a panel, a wheel, an engine case, a fan blade, and a building.

5. The manufacturing environment of claim 4, wherein the tracking system further comprises a passive tracking system.

6. The manufacturing environment of claim 4, wherein the data processing system is further configured to, responsive to an absence of a determination that the tool path is within a threshold from the final model of the object, generate an alert.

7. The manufacturing environment of claim 4, wherein the tracking system further comprises:
   a 6-degree-of-freedom laser tracker configured to send a laser beam onto a target attached to the tool and wherein the tracking system is further configured to track the corresponding location of the each of the plurality of operations performed by the tool using a plurality of responses detected by the 6-degree-of-freedom laser tracker.

8. The manufacturing environment of claim 4, wherein the data processing system is configured to cause the tool to perform a number of actions on the object based on a comparison of the map to the final model of the object.

9. The manufacturing environment of claim 8, wherein the number of actions comprises at least one of halting performing the plurality of operations on the object using the tool if a selected number of locations is out of tolerance, flagging each location in which a particular location is out of tolerance, and sending a message in response to the selected number of locations being out of tolerance.

10. The manufacturing environment of claim 4, wherein the plurality of operations is selected from at least one of a drilling operation, a trimming operation , a knurling operation, a milling operation, a boring operation, and a turning operation.

* * * * *